3,056,728
PROCESS FOR MANUFACTURING POWDERED PREPARATIONS CONTAINING FAT-SOLUBLE VITAMINS, ESSENTIAL OILS, AND MIXTURES THEREOF
Shinshiro Ohtaki, 192 Mizonokuchi, Kawasaki-shi, Kanagawa-ken, Japan
No Drawing. Filed Jan. 8, 1959, Ser. No. 785,571
Claims priority, application Japan Oct. 14, 1958
6 Claims. (Cl. 167—81)

This invention relates to processes for manufacturing a powdered nutritious preparation containing fat-soluble vitamins and powdered perfume, essence, and the like wherein the natural and artificial essential oils that are the raw materials for the above are powderized while preventing the decomposition and loss thereof. This invention also relates to the powdered nutritious preparation containing fat-soluble vitamins and the powdered perfume, essence, and the like that have been produced by the foregoing process.

An object of this invention is to provide a process for manufacturing a powdered nutritious preparation containing high units of fat-soluble vitamins and also the powdered nutritious preparation produced by this process.

Another object of this invention is to provide a process for manufacturing a powdered perfume and also the powdered perfume produced by this process.

Other objects of this invention will become apparent from the following description.

In order to facilitate the understanding of this invention, an explanation will be made first of the process for manufacturing a powdered nutritious preparation containing fat-soluble vitamins in accordance with this invention.

In the first place, fat-soluble vitamins easily oxidize and decompose when contact is had with oxygen. This however, being especially noticeable at high temperatures, in those that have been exposed to the air for several hours at about 65° C. even when hermetically sealed, after a lapse of from several weeks to several months, that destruction is remarkable can be seen when compared with those that have not been heated and exposed to the air.

Heretofore, various methods such as described below have been employed. However, all of these methods have defects and none are wholly satisfactory.

(A) A method of making fat-soluble vitamins to become absorbed into a base. However, this method has the following defects:
In order to maintain the powdered state, there is a limit to the amount of the vitamin oil that can be adsorbed.
Since the vitamin oil is exposed on the surface, a special type of stabilizing agent is required. Moreover, it is not suitable for mixing with those that would be destructive to other vitamins or fat-soluble vitamins.

(B) A method for drying by preparing an emulsion and spraying same onto the outside walls of a heated drum.

(C) A method of atomizing within a heated dryer.

(D) Other methods of powderizing by heat treatment.

However, in these methods of (B), (C), and (D), drying being carried out at high temperatures of 65° to 100° C., the product is affected to a certain extent by chemical changes and it is inevitable that destruction and losses in vitamins occur.

A method of spraying into a cold solvent: While this is a method wherein powderization is accomplished by spraying into a cold alcohol, this method also has defects as follows—

Since the solvent cannot be recovered and reused, it is economically disadvantageous.

Since the liquid to be treated enters the solvent in a liquid state, unless the emulsification is very complete, there is a possibility the oil portion might run over into the solvent.

It is difficult to regulate the dehydration effect of the solvent.

This invention is an improved method which has succeeded in overcoming the various above-mentioned defects. Precisely, it is a method which comprises first completely mixing and emulsifying the fat-soluble vitamins with the aid of an emulsifying agent in suitable substances which not only give form but also are useful in enveloping the vitamins such as dextrin, gelatin, casein, CMC, maltose, sucrose, gum arabic, tragacanth gum and the like, in accordance with a conventional method, then spraying into an atomized air current of a dehydrating solvent at a temperature of 60° C. or less, preferably within the range from 0° C. to 50° C., and if required, further repeating the atomization to complete simultaneously the dehydration as well as the removal of the excess oil to accomplish the powderization. The said gum arabic, tragacanth gum and the like are generally called water soluble gum substances.

The following is a detailed description of this invention. The fat-soluble vitamins, which have been thoroughly mixed in advance with an emulsifying agent, are mixed gradually while stirring in a liquid, in which dextrin, gelatin, casein, CMC, maltose, sucrose, water soluble gum substances and the like have been dissolved with a suitable amount of hot water. This emulsified mixture is sprayed into a drying chamber by either the jetting method or the centrifugal diffusion method. The drying chamber is provided with one or more jet orifices from which a dehydrating solvent, such as, for example, an aliphatic polyhydric alcohol, e.g., ethylene glycol, propylene glycol, glycerol, sorbital, etc., an aromatic alcohol e.g., benzyl alcohol, or a monohydric alcohol having less than 5 carbon atoms, e.g., ethyl alcohol, propyl alcohol, butyl alcohol, used separately or as mixtures thereof, is jetted simultaneously with the jetting of the aforementioned vitamin mixture in an amount about three times the amount of the latter. As emulsifying agents any of the wide variety in common use, excepting those saccharoids that are undesirable in foods and medicines, may be employed. For example, lecithin; glycerin monoesters such as glycerin monostearate, glycerin monopalmitate, glycerin monolaurate, glycerin monooleate, etc.; sucrose monoesters such as sucrose monostearate, sucrose monopalmitate, sucrose monolaurate, sucrose monooleate etc.; polyoxyalkylene sorbitan monoesters such as polyoxymethylene sorbitan monostearate, polyoxymethylene sorbitan monopalmitate, polyoxymethylene sorbitan monolaurate, polyoxymethylene sorbitan monooleate etc.; and sorbitan monoesters such as sorbitan monostearate, sorbitan monopalmitate, sorbitan monolaurate, sorbitan monooleate, etc. may be used singly or in combination.

The fine diffused grains of the vitamin mixture come in contact with the mist of the jetted dehydrating solvent mentioned above, and thus lose their water and become powderized. Therefore, none of the chemical changes whatever which might possibly occur by heating as might happen in the heretofore known methods will occur with this method. On the other hand, mist of the moisture-laden dehydrating solvent is conveyed to the condensation and recovery apparatus. In case the dehydration of the powder obtained from the treated liquid is still insufficient after a one-time dehydration by atomization, it is possible to more completely dehydrate it by drying the product by further low-temperature drying or by drying by jetting it into a second or a second and a third atomization drying chamber for further drying within the misty atmosphere of a dehydrating solvent. Although this dried powder contains a little of the dehydrating solvent, this can easily be dried out by mechanical means or by a dried air current. Moreover, propylene glycol and the like, which are not easily dried out, being not only harmless, but also being germicidal, and consequently having rather such an effective aspect from the storage standpoint, there is no objection to a little amount being left in the product; however, if there is a necessity that it must be removed, it can be completely removed by a one-time washing with alcohol. The thus obtained powder containing fat-soluble vitamins is collected in a suitable collecting chamber and screened to segregate the powder particles into uniform sizes. This fat-soluble vitamin powder presents a dried appearance and the vitamins are hardly damaged during the manufacturing process.

In this invention, when the fat-soluble vitamins, which have been completely emulsified and dispersed in a solution of a film-forming material such as dextrin, gelatin, casein, CMC, maltose, sucrose, water soluble gum substances and the like, is caused to be changed into fine grains and is sprayed into an atomized air current of a liquid possessing dehydrating properties. The sprayed fine grains containing fat-soluble vitamins mix well with the misty air current of the atomized dehydrating solvent, become suspended and float therein, and while precipitating by gravity, contact well with the misty droplets of the dehydrating solvent to accomplish the dehydration effectively. Thus the above-mentioned defects that are present when dehydration is carried out in such dehydrating liquids as alcohols are overcome. Furthermore, the dehydration being possible without any special heating, there is no possibility of the destruction of vitamins by heating as may happen by the above-mentioned methods employing heat. In this invention, by performing the foregoing atomization dehydration at a temperature of about 60° C., particularly within the range from 0° C. to 50° C., it is possible to prevent the destruction of vitamins by heat. Hence, in this invention when fat-soluble vitamins and the enveloping substances are mixed in the presence of an emulsifying agent, while it is necessary in order to prevent the destruction of the fat-soluble vitamins that the mixing and emulsifying be carried out at a low temperature of about 60° C. or less, if possible, it is possible to more easily obtain a homogeneous emulsified solution if some heat is employed in the emulsifying and mixing operations. To fulfill these two requirements, in this invention, although heat is employed at the time of emulsifying and mixing, it is possible to cool the temperature to from 0° C. to 50° C. before carrying out the atomization dehydration as described above. In view of the fact there is a possibility that the antioxidant property with respect to fat-soluble vitamins of the heretofore known synthetic antioxidants, with the exception of tocopherol, might be reduced at a temperature of 65° C. or above, when heat is applied to the above vitamins, even though temporarily, in the powderization, it is preferable that it be carried out at a temperature of about 60° C. or less. Therefore, by this invention it is possible to provide a powdered preparation very efficiently without lowering the potencies of the vitamins and moreover which, being enveloped by a tough and closely pored film, makes for long time stability as well as ease and convenience in handling and storage.

In spraying the vitamins and dehydrating, it is best to spray them in a gyrating manner or in an alternating fashion so that the length of time that the former is made to be suspended and remain in the mist of the latter is lengthened to obtain a complete contact between the two. Moreover, the aforementioned film-forming agents such as dextrin and the like can be used alone, however, it is best that two or more are mixed and used. Also, when spraying the dehydrating solvent, if inert gases (for example, nitrogen gas or carbon dioxide gas) are used, the antioxidant effect is further enhanced.

When the vitamin A powdered product obtained by the method of this invention was compared with respect to its stability with those of "Dry A," also a powdered vitamin product of foreign origin sold in Japan, and a vitamin A oil of Japanese production, the results were as follows:

[Storage temperature—45° C.]

| Sample | Period of Storage | Reduction in Potency, percent |
|---|---|---|
| "Dry A" of foreign origin sold in Japan (250,000 units). | 3 mo. | 8 |
| The product by this invention (250,000 units) | 3 mo. | 8 |
| Vitamin A oil produced in Japan (1,500,000 units). | 50 days | 50 |

The method of manufacturing powdered nutritious preparation containing fat-soluble vitamins as described in detail above can be adapted without change to the manufacture of powdered perfume, essence, and the like products.

Heretofore, the method of manufacturing powdered perfume, essence, and the like by coating the surface of the fine grains of essential oils with a gum substance is publicly known. To be sure, the powdered perfume, essence, and the like products, which have been treated in this manner are easily handled and are very effective in preventing the escape of the aroma. The method of manufacturing this powdered perfume, essence, and the like comprises the atomization dehydration of essential oils which have been emulsified in an aqueous solution of a gum-like substance. The defect of this method lies in the fact that heated air is used for drying.

While the volatility or evaporation of all matters are facilitated by a rise in the temperature, this is especially conspicuous in the case of perfumes and essences. Since these materials are to be dried by being passed through hot air at a temperature of one hundred and several tens of degrees, the loss is great, and moreover much of that easily volatilizable portion of the component of the perfume or essence being lost, it is inevitable that a change in the composition of the aroma will occur.

This invention can remove such a defect as this. In accordance with this invention, since the use of air at a high temperature is avoided and the moisture is removed by use of a dehydrating solvent at low temperatures, the loss of the fragrance is small and there is no change in the aroma. Also, in this case, it is possible to control, as desired, the volatization rate of the aroma by varying the size of the grains and the thickness of the covering film.

This invention will be described in detail as follows: The essential oils, which have been mixed well with an emulsifying agent in advance, are mixed gradually into a solution in which gelatin, casein, CMC, gum substance such as gum arabic and tragacanth gum, dextrin, other saccharoids, or the like have been dissolved well with a suitable amount of hot water. This treated liquid is sprayed into a drying chamber by the jetting method or the centrifugal diffusion method. The drying chamber is provided with one or more jet orifices from which, simultaneous with the jetting of the aforementioned emulsified mixture of essential oils, a dehydrating solvent, for example, an aliphatic polyhydric alcohol, an aromatic alcohol, or a monohydric alcohol having less than 5 carbon atoms, is jetted in an amount about five times the amount of the former. The diffused grains of the treated liquid, upon coming in contact with the mist of the above jetted dehydrating solvent, lose their moisture and thus become powderized. Therefore, changes in the aroma or volatilization of fragrance which might possibly occur by heating as might happen in the hitherto known methods do not occur. On the other hand, the moisture-laden solvent is conveyed to the condensation and recovery apparatus for recovery of the solvent. In case the dehydration of the powder obtained from the treated liquid is still insufficient after a one-time dehydration by atomization, it is possible to more completely dehydrate it by drying the product by further low-temperature drying or by drying by jetting it into a second or a second and a third atomization drying chamber for further drying within the misty atmosphere of a dehydrating solvent. Although this dried powder has a little of the dehydrating solvent adhering to it which can be easily dried out by mechanical filtering or by passing dried air over it, those solvents which have comparatively high evaporation temperatures, such as propylene glycol and the like, can be, if required, removed completely by merely washing them one time in alcohol.

*Example 1*

4 g. of crystalline calciferol (vitamin D) were caused to be dissolved promptly in 100 g. of vitamin A palmitate (1,200,000 units) by heating at a temperature of 50° C. or less. To this were mixed 4 g. of a mixture of equal parts of BHA (butylated hydroxy anisole) and BHT (butylated hydroxy toluene) as the antioxidant and 20 g. of the fatty acid ester of sorbitan as the emulsifying agent. This mixture was poured into and emulsified in an aqueous solution prepared by dissolving 170 g. of skim milk and 10 g. of sugar in 500 g. of water of a temperature of about 50° C. This was then sprayed into an atomized air current of anhydrous propylene glycol, and the semi-dried powder was sedimented at the bottom of the dryer. The moisture-laden propylene glycol vapor was condensed at the exhaust port and was conveyed to the dehydrating apparatus to be recovered. The deposited material was automatically sprayed into No. 2 drying chamber (powder dryer) exposed to the atomized air current of propylene glycol, and again sedimented. The propylene glycol adhering to the surface was removed with alcohol to complete the preparation of the dry powder. The loss during the manufacturing process with respect to vitamin A of this product was approximately 5%.

*Example 2*

50 g. of vitamin A acetate (1,500,000 units) and 20 g. of the fatty ester of sorbitan were heated together to 50° C. and were promptly dissolved together with 2 g. of BHA and 2 g. of BHT 150 g. of skim milk, 50 g. of gelatin, and 50 g. of dextrin were separately dissolved in 800 g. water and heated to about 55° C. The aforementioned mixture of the vitamin oil and the emulsifying agent was mixed in with the latter. This was sprayed into an atomized air current of propylene glycol in a dryer and the powder was sedimented. For removing the small amount of oiliness adhering, the powder was passed through anhydrous propylene glycol by means of a screw conveyor, and the propylene glycol was removed by using a filter to obtain the product.

*Example 3*

10 g. of lecithin were added to 1 kg. of orange oil and dissolved at a temperature of from 30° to 35° C. Separately, an aqueous solution was prepared by disolving in 3 l. of warm water 150 g. of gelatin, 150 g. of casein, 80 g. of dextrin (prepared into a paste in advance by boiling in 1 l. of water), 20 g. of sugar, and 600 g. of gum arabic. This was heated to 40° C., and while stirring, the aforementioned orange oil was gradually added and emulsification was accomplished. This treated liquid was sprayed into an atomized air current of propylene glycol in a drying chamber, the powder was sedimented, followed by separation of the propylene glycol, and further by washing with a small amount of alcohol to obtain the dried product.

What is claimed is:

1. Process for manufacturing powdered preparations containing fat soluble vitamins, essential oils, and mixtures thereof, enveloped in a stable film, which comprises mixing an oil material containing fat soluble vitamins, essential oils, and mixtures thereof, with an emulsifying agent and a substance having film forming properties, and spraying the resultant emulsion at a temperature lower than 60° C. into a current of an atomized dehydrating agent selected from the group consisting of an aliphatic polyhydric alcohol, an aromatic alcohol, and a monohydric alcohol of less than 5 carbon atoms, and separating said dehydrating agent from said oil material whereby said oil material is obtained as a dry powder, the particles of which are enveloped in a film.

2. Process for manufacturing powdered preparations containing fat soluble vitamins, essential oils, and mixtures thereof, enveloped in a stable film, which comprises mixing an oil material containing fat soluble vitamins, essential oils, and mixtures thereof, with an aqueous solution in an emulsifying agent and a substance having film-forming properties, and spraying the resultant emulsion at a temperature of from 0° to 50° C. into a current of an atomized organic dehydrating agent selected from the group consisting of an aliphatic polyhydric alcohol, an aromatic alcohol, and a monohydric alcohol of less than 5 carbon atoms, and separating said dehydrating agent from said oil material whereby water is removed from said oil material and said oil material is obtained as a dry powder, the particles of which are enveloped in a film.

3. A process for manufacturing a powdered nutritious preparation containing fat soluble vitamins, essential oils, and mixtures thereof, enveloped in a stable film, which comprises mixing an oil material containing fat soluble vitamins, essential oils and mixtures thereof, with an aqueous solution of an emulsifying agent and a substance having film-forming properties selected from the group consisting of dextrin, gelatin, casein, CMC, maltose, sucrose, and gum arabic, and spraying the resultant emulsion at a temperature of from 0° to 50° C. into a current of an atomized organic dehydrating agent selected from the group consisting of an aliphatic polyhydric alcohol, an aromatic alcohol, and a monohydric alcohol of less than 5 carbon atoms, and separating said dehydrating agent from said oil material whereby water is removed from said oil material, and said oil material is obtained as a dry powder, the particles of which are enveloped in a film.

4. The process of claim 1 wherein the dehydrating agent is selected from the group consisting of ethylene glycol, propylene glycol, glycerol, sorbitol, benzyl alcohol, ethyl alcohol, propyl alcohol and butyl alcohol.

5. The process of claim 2 wherein the dehydrating agent is selected from the group consisting of ethylene glycol, propylene glycol, glycerol, sorbitol, benzyl alcohol, ethyl alcohol, propyl alcohol and butyl alcohol.

6. The process of claim 3 wherein the dehydrating agent is selected from the group consisting of ethylene glycol, propylene glycol, glycerol, sorbitol, benzyl alcohol, ethyl alcohol, propyl alcohol and butyl alcohol.

References Cited in the file of this patent

UNITED STATES PATENTS

| | | |
|---|---|---|
| 2,643,209 | Goett | June 23, 1953 |
| 2,650,895 | Wallenmeyer et al. | Sept. 1, 1953 |
| 2,756,177 | Cannalonga | July 24, 1956 |